United States Patent [19]

Adani et al.

[11] Patent Number: 4,579,313

[45] Date of Patent: Apr. 1, 1986

[54] SAMPLE MOUNTING SYSTEM

[75] Inventors: Keith J. Adani, Baroda; Gordon C. Ford, Coloma, both of Mich.

[73] Assignee: Leco Corporation, St. Joseph, Mich.

[21] Appl. No.: 703,829

[22] Filed: Feb. 21, 1985

[51] Int. Cl.[4] .......................... B29C 1/00; B29D 3/00
[52] U.S. Cl. ...................... 249/95; 249/119; 249/120; 249/83; 425/123
[58] Field of Search ................ 249/83, 91, 95; 425/123, 127

[56] References Cited

U.S. PATENT DOCUMENTS

| | | | |
|---|---|---|---|
| 2,845,657 | 8/1958 | Beare | 425/123 X |
| 2,860,583 | 11/1958 | Hitch | 249/95 |
| 3,810,600 | 5/1974 | Smith et al. | 249/95 |
| 4,090,830 | 5/1978 | Laliberte | 249/91 X |
| 4,332,537 | 6/1982 | Slepcevic | 249/95 X |
| 4,534,536 | 8/1985 | Nelson et al. | 425/123 X |

*Primary Examiner*—J. Howard Flint, Jr.
*Attorney, Agent, or Firm*—Price, Heneveld, Huizenga & Cooper

[57] ABSTRACT

A sample mounting system includes a coupon holder having a plurality of apertures defining in part mold cavities for supporting a plurality of printed circuit board coupons on the holder. A removable mold is also provided and engages the coupon holder to define mold cavities into which molding resin is poured. The mold is then removed from the coupon holder which is secured in an annular stop ring and mounted to a polishing machine for polishing coupons molded in place with respect to the holder.

16 Claims, 13 Drawing Figures

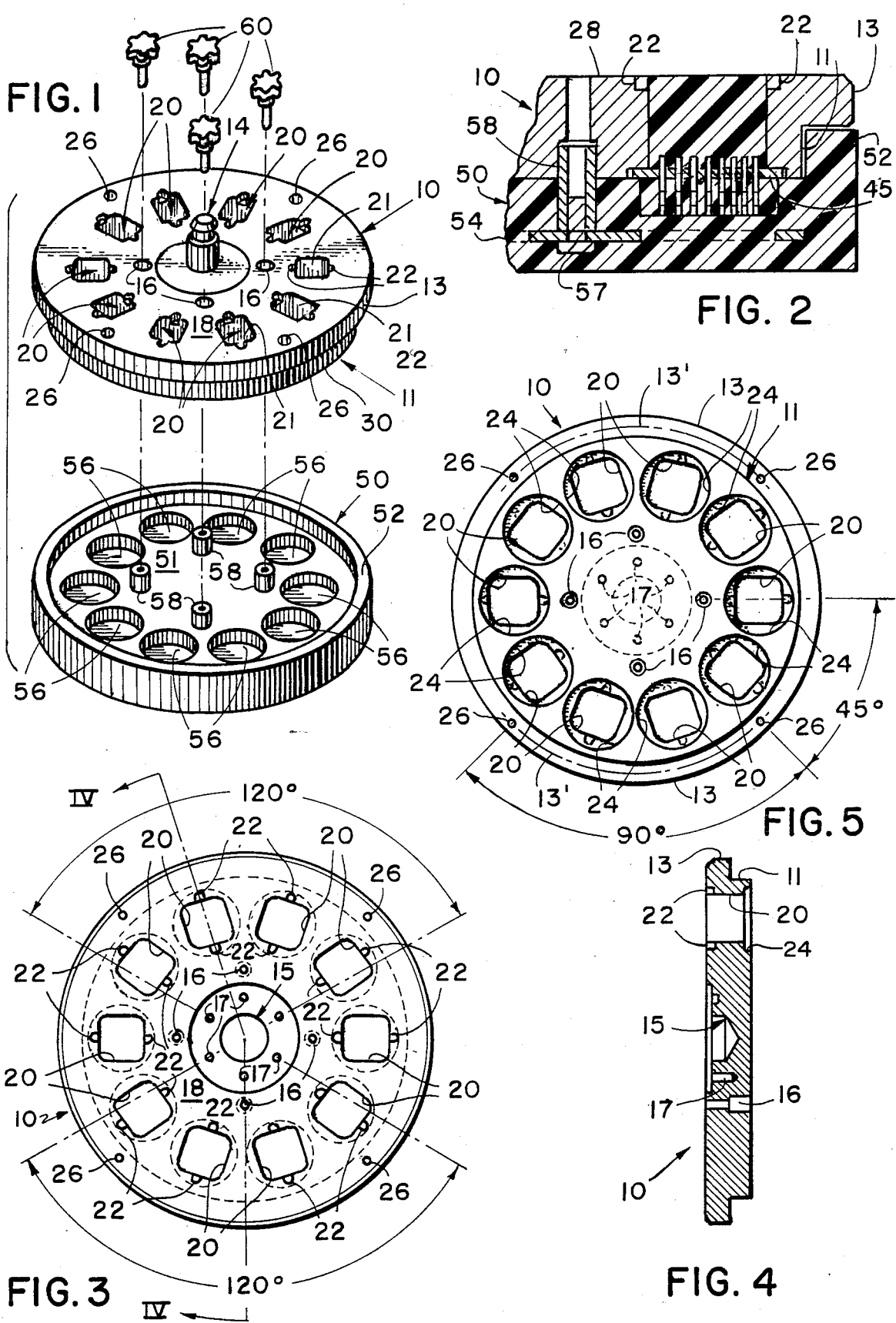

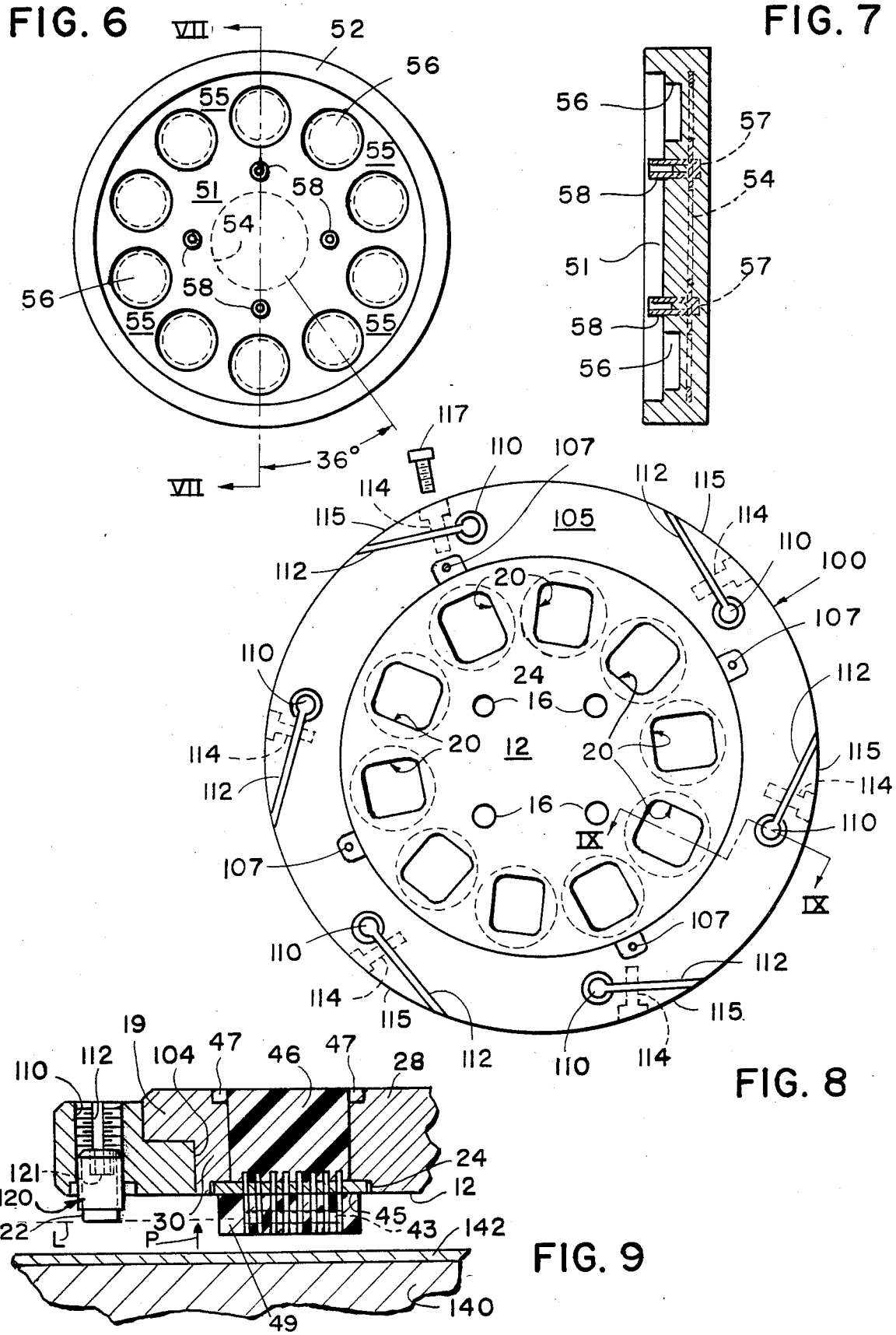

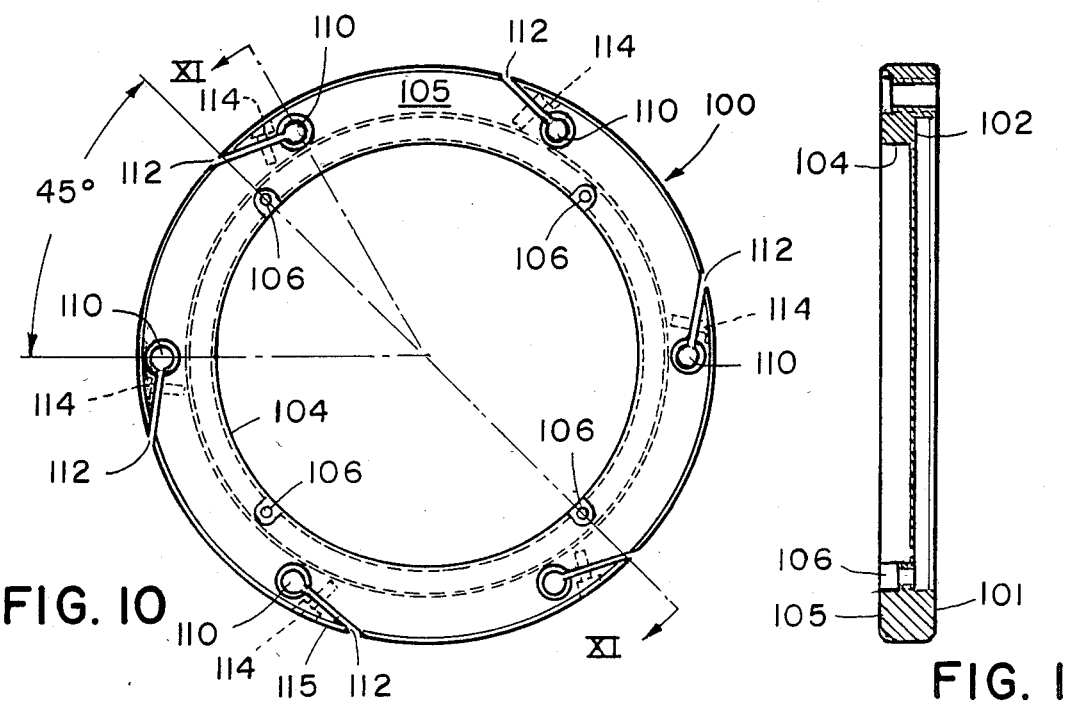
FIG. 10
FIG. 11
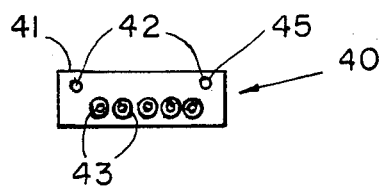
FIG. 12
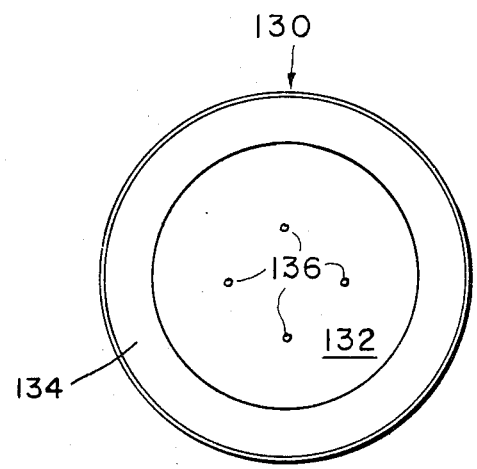
FIG. 13

SAMPLE MOUNTING SYSTEM

BACKGROUND OF THE INVENTION

The present invention relates to a sample mounting system and one particularly adapted for use in mounting printed circuit board coupons for polishing.

Printed circuit board coupons with precisely located holes for mounting the coupons such that test through holes can be polished are described in military specification MIL-STD-275 and are well-known. In order to mount a plurality of these coupons simultaneously for inspection and therefore, increase the number of printed circuit board coupons that can be inspected in a given time, a separate mold form has been provided and is generally of truncated conical shape such that a plurality of coupons can be molded and fixed in position in such mold. The mold is subsequently positioned in a specimen polisher disk. Such a system is commercially available from Struers Inc. of Cleveland, Ohio and involves a multiple step molding process and subsequently, placing the molded form containing the coupons into a polishing disk which employs O-rings to hold the mold forms in place. The separate placement of the molded form in the sample holding disk can lead to inaccuracies in depth of polishing since the coupons may not be accurately positioned with respect to the polishing surface as controlled by carbide tipped stops. Also, the separate molding and subsequent mounting of the molded shape in the specimen holding disk requires additional manual labor, slowing the overall sample inspection process.

SUMMARY OF THE PRESENT INVENTION

The system of the present invention improves upon the sample preparation process and apparatus used in connection therewith by molding a plurality of printed circuit board coupons directly in a sample holder for subsequent polishing. Systems embodying the present invention include a coupon holder having a plurality of apertures defining at least in part mold cavities together with means for supporting a pluralilty of coupons on the holders. A removable mold engages the coupon holder and defines a mold cavity into which molding resin is poured and cured. The mold is then removed from the coupon holder which is secured in an annular stop ring and holder mounted to a polishing machine for polishing coupons molded in place with respect to the holder.

In a preferred embodiment of the invention, the coupon holder mold cavities are generally square in shape to lock the mold form in position against rotation with respect to the holder. By shaping the mold cavity to accurately position coupons with respect to a reference surface thereof, precise polishing to a reference plane of the test through holes can be achieved.

The system of the present invention, therefore, provides both structure and a method for quickly mounting and polishing a plurality of coupons in a multicavity coupon holder defining in part a mold cavity in connection with a removable mold with the coupon holder being mounted to a stop ring for initial polishing to a precisely defined reference plane controlled by the precision molding and mounting of the coupons with respect to the coupon holder.

These and other features, objects and advantages of the present invention will become apparent upon reading the following description thereof together with reference to the accompanying drawings in which:

BRIEF DESCRIPTION OF THE DRAWINGS

FIG. 1 is an exploded, perspective view of the coupon holder and mold of the present invention;

FIG. 2 is a greatly enlarged, fragmentary, cross-sectional view of one of the mold cavities including a plurality of coupons being molded therein before removal of the mold;

FIG. 3 is a top plan view of the coupon holder;

FIG. 4 is a cross-sectional view of the structure shown in FIG. 3 taken along section line IV—IV;

FIG. 5 is a bottom plan view of the coupon holder;

FIG. 6 is a top plan view of the mold;

FIG. 7 is a cross-sectional view of the structure shown in FIG. 6 taken along section line VII—VII;

FIG. 8 is a bottom plan view of the coupon holder plate assembled to the stop ring;

FIG. 9 is an enlarged, fragmentary, perspective view of one of the mold cavities of the coupon holder together with the stop ring and a stop held in position with respect to a polishing element;

FIG. 10 is a detailed, top plan view of the stop ring also shown in FIG. 8;

FIG. 11 is a cross-sectional view of the structure shown in FIG. 10 taken along section line XI—XI;

FIG. 12 is a front elevational view of one of the coupons and the support rods extending therethrough; and FIG. 13 is a front elevational view of the reference adjustment plate.

DETAILED DESCRIPTION OF THE PREFERRED EMBODIMENT

The sample holder system and method of use includes a coupon holder 10 (FIG. 1) in which the coupons 40 (FIG. 12) are molded in place, a mold 50 which is employed in connection with the coupon holder 10 for the molding-in-place of the coupons, an annular stop ring 100 (FIGS. 8, 10 and 11) into which the coupon holder 10 is mounted for the subsequent specimen polishing process, as illustrated in FIG. 9, and finally, a reference stop adjustment plate 130 (FIG. 13) to which the holder and stop ring are mounted for accurately preadjusting the stops to control the polishing depth. Before describing the overall process and use of these elements, a detailed description of their physical structure is presented beginning with the coupon holder 10 shown in detail in FIGS. 3-5 and shown in perspective view in FIG. 1.

The coupon holder 10 comprises a machined aluminum disk having a generally circular shape with an annular flange 13 with a lower surface 13' adjacent cylindrical sidewall 11. The flange 13 and wall 11 interengage either the mold 50 or the stop ring 100 for securely attaching the holder to these members during use. The central bottom surface 12 of holder 10 is machined flat to define a reference surface.

The coupon holder includes a central circular aperture 15 extending partially downwardly therethrough, as best seen in FIG. 4, for receiving a conventional mounting spindle 14 (FIG. 1) held in place with respect to the holder by means of a plurality of hexhead screws extending within threaded apertures 17 in holder 10, as best seen in FIGS. 3 and 4. Spaced along a fixed radius and at 90 degree intervals are four apertures 16 which align with and receive threaded standoffs 58 associated with mold 50 for removably securing the mold to the holder, as illustrated in FIG. 2.

Extending downwardly through the top surface 18 of holder 10 and through the body of the holder are ten configured apertures 20 defining at least in part mold cavities which have a generally square shape extending through the holder but with slightly rounded corners. The square shape assures that the molded-in-place coupons and holding resin will remain rotationally fixed with respect to the holder during the polishing process. Each of the apertures 20 include a pair of opposed slots 22 (FIGS. 1-4) adjacent the top edge thereof and extending downwardly a short distance through top surface 18 of the coupon holder, as best seen in FIG. 4. The slots 22 permit the mold resin material 46 (FIGS. 2 and 9) to extend therein such that if high shrinkage molding resin is employed, the resultant molded tabs will hold the mold form and coupons in place with respect to the holder.

Formed upwardly through the bottom surface 12 of the holder are circular recesses 24 (FIGS. 4, 5 and 8) which are coaxially aligned with each of the square mold apertures and provide a reference surface area into which coupon holding pins 45 (FIGS. 2, 9 and 12) are fitted during the molding process and subsequently, held in place during polishing, as described in greater detail below.

Holder 10 also includes four apertures 26 spaced around the outer rim of the holder at 90 degree intervals for receiving fastening bolts 107 which secure the holder to the stop ring for the polishing process, as illustrated in FIGS. 8 and 9.

The coupon holder 10 is machined of aluminum with its entire surface coated with a lubricious polymeric material, such as TEFLON®, or other suitable non-stick coating to facilitate removal of the molded material subsequent to the polishing and/or inspection process. The coating 28, shown in FIGS. 2 and 9, is applied in a conventional manner by spraying and baking and has a thickness of 0.002 inches with a penetration of the TEFLON® into the aluminum of about half that amount.

The mold 50 is shown in FIG. 1 and in detail in FIGS. 6 and 7 and comprises a silicone material molded into a shallow cup shape configuration having an upwardly extending annular rim 52 which seatably engages wall 11 and flange 13 of the holder, as best seen in FIG. 2. Mold 50 includes an embedded aluminum disk-shaped stiffener 54 (FIGS. 2, 6 and 7) molded in coaxial alignment with the holder. Mold 50 includes ten circular blind recesses 56 extending partially downwardly through floor surface 51, as best seen in FIGS. 2 and 7, to define a lower mold cavity portion into which coupons 40 (FIGS. 2, 9 and 12) extend, as described in greater detail below.

The disk-shaped stiffener plate 54 includes four equally, radially spaced, threaded standoff metal sleeves 58 which are attached to plate 54 by fastening screws 57 (FIG. 7) and which project upwardly through the top surface 51 of the mold, as best seen in FIG. 1. Sleeves 58 extend into apertures 16 of holder 10 with surface 51 abutting against the corresponding mating lower surface 12 of holder 10 during the molding process. Mold 52 is securely held in place by four knobbed fastening screws 60 (FIG. 1) which extend through holder 10 and threadably engage the sleeves 58 holding the mold 50 to the holder with rim 52 seated in annular groove 11, as best illustrated in FIG. 2. By employing a polymeric material, such as silicone, for the mold shape 50 and employing a stiffening plate 54, a mold shape which cooperates with the holder 10 is provided and which can be readily removed inasmuch as the cold setting resin employed to form the coupon holder does not adhere to the mold 50 which, after the molding resin cures, is separated from holder 10.

Before describing the molding process in detail, a description of a standard coupon shape together with the positioning of the coupons with respect to the holder and mold is presented in conjunction with FIGS. 1, 2 and 12. The coupon 40 shown is generally rectangular and as noted above, is configured according to standard coupon specifications. Each coupon includes a pair of indexing holes 42 which have their centers exactly ½ inch apart in a horizontal direction and are spaced downwardly from the top edge 41 of the coupon by 0.15 inches. The coupon also includes a plurality of test through holes 43 which have their centers located approximately 0.25 inches from top edge 41 with the overall height of the coupon being approximately 0.4 inches and having a width of 0.75 inches. Extending through indexing apertures 42 of the coupons are a pair of support rods 45 which are strung through a plurality of coupons for supporting the coupons with respect to one another and holding the coupons within the mold cavities defined by holder 10 and mold 50.

In the example shown, eight coupons are strung on a pair of support pins 45 although a greater or fewer number may be employed. As can be appreciated, by precisely machining the lower surface 12 of holder 10, including recesses 24, the position of the test through holes 43 with respect to surface 12 can be precisely determined for purposes of accurate sample preparation for microscopic examination. To mount the plurality coupons 40 held by support rods 45 to the holder within each of the apertures 20, the holder is inverted (i.e., side 18 down) on a suitable support surface, and the coupons placed across the rectangular apertures 20 with rods 45 laying across recesses 24, as illustrated in FIGS. 2 and 9. The rods have a diameter of about 0.078 inches with the depth of recesses 24 being 0.061 inches. Thus, when the resilient polymeric mold 50 is placed over the bottom 12 of holder 10, the annular peripheral surface 55 surrounding apertures 56 will compressibly engage support rods 45, as illustrated in FIG. 2, for holding the coupons and the support rods in alignment within the mold cavity 20. The center of the test through holes of coupons 40 will extend below surface 12 about 0.061 inches (i.e., 0.1 inches less 0.078/2 inches) which constitutes the stop adjustment setting, as described below.

The holder 10 may receive up to ten sets of eight or more coupons, one set for each cavity or a lesser amount as is desired with the total capacity of the holder of the preferred embodiment being approximately one hundred coupons. The holder 10 and mold 50 sandwiching the coupons in place is then inverted and fasteners 60 secured to hold the assembly in place while a conventional cold setting molding resin is poured through the top openings 21 (FIG. 1) of the mold cavities and allowed to cure. Commercially available LECOSET 7007 resin can be employed which takes approximately nine minutes to cure, after which fasteners 60 and mold 50 removed. Polishing of the coupons 40 is achieved with the mold form 46 including the coupons 40 and holding rods 45 molded in place in holder 10. Thus, it is unnecessary to remove the sample form 46 from the holder or the rods 45 from the mold form during the polishing process.

The generally cylindrical mold form 46 is locked within the apertures 20 at the upper end in part by the integrally molded tabs 47 and at the lower end by the larger diameter end 49 (FIG. 9) as well as by the rectangular shape of cavities 20.

The lower end 49 of the mold form 46 extends downwardly below the level of the test holes 43, as best seen in FIG. 9, with the polishing direction being upward, as indicated by arrow P in FIG. 9, to a distance indicated by level line L corresponding to the center of test holes 43 by use of the associated stop ring 100 now described in connection with FIGS. 8–11.

The stop ring 100, like holder 10, is machined of aluminum and includes an annular recess 102 formed downwardly through the top surface 101 thereof and shaped to receive flange 13 of holder 10 with the narrowed lower cylindrical portion 30 of holder 10 extending through a circular aperture 104 extending through the annular ring 100, as best seen in FIG. 9. Ring 100 includes four equally spaced recessed threaded apertures 106 formed in the flange area 104 such that holder 10 can be removably secured within the stop ring 100 by threaded fasteners 107 such as hexhead screws which extend through apertures 26 in the flange 13 of holder 10 and into apertures 106 of ring 100. Spaced at 60 degree angular intervals around the ring 100 are six threaded carbide stop apertures 110 each communicating with a tangentially extending slot 112 extending from the periphery of the ring. Extending transversely to each of the slots 112 is a pair of vertically spaced, threaded apertures 114 which permit radial compression of the crescent-shaped legs 115 formed by the slots 112 against the threaded apertures 110 for locking an adjustable carbide tipped stop 120 into place once adjusted to its desired position.

Each of the adjustable stops 120 (FIG. 9) comprise a cylindrical, externally threaded cap screw having a socket head 121 and a carbide tip 122 with a machined flat end 123. The stops 121 are threaded downwardly into the threaded apertures 110 to a predetermined level such that their bottom surface 123 is spaced below bottom reference surface 12 of holder 10 a distance of 0.061 inches to assure that the polishing of the sample extends to the center of test apertures 43. To assure proper adjustment of each of the six adjustable stops 120, a reference adjustment plate 130 is employed.

The adjustment plate, as seen in FIG. 13, is a flat machined plate 130 having a flat, raised, circular, upper surface 132 which engages the lower surface 12 of holder 10 and is held in place thereof by fastening screws extending through apertures 16 in the holder into threaded apertures 136 in plate 130. The annular outer surface 134 of plate 130 is recessed downwardly from surface 130 0.061 inches. To adjust the stops 120, ring 100 is secured to holder 10 prior to the molding of the material in holder 10, which in turn is secured to adjustment plate 130. The adjustable stops 120 are then screwed downwardly until they engage surface 134 which precisely aligns the lower surface 123 of each of the stops such that the 0.100 of an inch spacing between the center of locater apertures 42 and test through holes 43 is achieved.

Once the stops have been adjusted, with respect to plate 130, the lock screws 117 are tightened to lock the stops 120 in place by compressing crescent-shaped legs 115 and closing slots 112 around threaded apertures 110.

The holder 10 and ring 100 are then removed from plate 130, and the stops typically do not need to be readjusted through several uses.

Once the coupons have been molded in place with respect to holder 10, it is secured within ring 100 for polishing, as illustrated in FIG. 9. Spindle 14 is mounted within a conventional chuck of a polishing machine, such as a commerically available Leco Model No. AP-200 or AP-600, which includes a lower rotary turntable 140 having a polishing disk 142 mounted thereon such that a rotational motion is provided between the lower surface 49 of the coupon holding mold form 46 and the abrasive surface 142 associated with the polishing machine to mechanically abrade away the resin materal and printed circuit coupons 40 until the lower surface 123 of stops 120 engage surface 142. This contact is audibly noticable to the operator during the process, and the polishing machine is stopped to remove the sample holder 10 therefrom. With the setting of the six stops 120, the coupons 40 will be ground upwardly to the center (line L of FIG. 9) of the test through holes. This initial polishing may provide the desired surface preparation for examination of the test holes 43 although if additional polishing is necessary, it can be achieved by removing the sample holder 10 from ring 100 and continuing polishing using an extremely fine abrasive disk in connection with the polisher wheel 140, to provide a finish polish to the sample. Also, disk 142 can be replaced with progressively finer grit polishing disks as the stops 120 approach the surface of the disks. The samples can then be examined microscopically either while remaining in the sample holder 10 or by removing the sample form 46 by tapping the form at its top surface, breaking flanges 47 and allowing removal of the sample for handling and inspection. The lubricious polymeric coating 28 permits the resin material to be freely removed once tabs 47 have been broken.

Thus, with the system of the present invention, coupons are precisely molded in fixed position with respect to a polishing holder for subsequent precise polishing without the need for removal of the mold form from the mold and insertion into a separate holder and without removing indexing pins aligning the coupons with respect to the coupon holding mold form. The method of molding the coupons precisely in place by holding the coupons and alignment pins in precise relationship in compression between the holder 10 and mold 50 until the molding resin solidifies assures accurate location of the coupons with respect to the holder reference surface 12. The holder is then secured within the stop ring 100 and the holder and ring 100 inserted into a standard polishing machine for polishing. The process is, therefore, relatively uncomplicated for the operator, provides a precision polishing result at a minimum of time and allows preparation of up to one hundred coupons for examination during a single polishing and sample preparation cycle. By providing a removable stop ring 100, finish polishing of the sample preparation can be accomplished employing the unique sample holder 10.

It will become apparent to those skilled in the art that various modifications to the preferred embodiment herein can be made without departing from the spirit or scope of the invention as defined by the appended claims.

The embodiments of the invention in which an exclusive property or privilege is claimed are defined as follows:

1. A system for molding printed circuit board coupons in a holder for subsequent polishing for microscopic inspection comprising:
   a coupon holder including a plurality of apertures defining at least in part a plurality of mold cavities, said apertures extending through opposite sides of said holder, and wherein one side of said holder defines a reference surface;
   a mold having a shape for engaging said one side of said holder to enclose an end of each of said apertures adjacent said one side to define in cooperation with said holder, the plurality of mold cavities;
   means for supporting a plurality of coupons on said one side of said holder such that they extend into said mold cavities; and
   means for securing said mold to said holder such that the coupons are held in place while a molding material is introduced into said mold cavities.

2. The system as defined in claim 1 and further including:
   an annular stop ring including means for removably securing said ring to said holder, said ring including stop means extending from a side adjacent said one side of said holder to control the depth of polishing of coupons held in said holder.

3. The system as defined in claim 1 wherein said apertures formed in said holder have a generally square cross section to define a mold cavity having at least a portion with a generally square cross section.

4. The system as defined in claim 3 wherein said supporting means includes a recess formed in said one side of said holder adjacent each aperture, said recess shaped to hold coupon holding rods in a relationship to said reference surface.

5. The system as defined in claim 4 wherein said holder is coated with a lubricious polymeric material to prevent a molding material from sticking thereto.

6. A specimen holder system for polishing printed circuit board coupons for microscopic examination comprising:
   a holder having a generally disk-shaped body with one side of said body defining a reference surface, said body having a plurality of generally square transverse cross section apertures extending therethrough, said body including a coating of lubricious polymeric material;
   means on said one side of said body adjacent each aperture for supporting a specimen in a relationship to said reference surface; wherein the specimens are printed circuit board coupons and wherein said supporting means includes a recess formed in said one side of said holder adjacent each generally square aperture, said recess shaped to hold coupon holding rods in a relationship to said reference surface; and
   a mold having a shape for engaging said one side of said holder to enclose an end of each of said apertures and means securing said mold to said holder such that specimens can be molded in said holder.

7. The holder as defined in claim 6 and further including:
   an annular stop ring including means for removably securing said ring to said holder, said ring including stop means extending from a side adjacent said one side of said holder to control the depth of polishing of coupons held in said holder.

8. A sample holder system for printed circuit board coupons comprising:
   a mold form;
   a disk-shaped body having a plurality of generally square-shaped apertures formed therethrough, said apertures arranged in spaced relationship about a common radius from the center of said body;
   a circular recess formed in one side of said body in concentric relationship with each of said apertures, said recesses having a depth for aligning coupon holding rods in predetermined spaced relationship with respect to said one side;
   means for securing a spindle to said body on a side opposite said one side;
   an indexing ring; and
   means for selectively mounting said body to one of said mold form and said indexing ring for molding coupons in mold cavities defined at least in part by said apertures and for subsequently polishing coupons.

9. The system as defined in claim 8 wherein said selective mounting means includes a peripheral mounting flange on said body adjacent a side opposite said one side.

10. The system as defined in claim 9 wherein said selective mounting means further includes a plurality of mounting apertures formed through said body for extending fasteners therethrough.

11. The system as defined in claim 10 and further including locking tab forming recesses formed in said body in a side opposite said one side and adjacent opposite sides of each square aperture.

12. The system as defined in claim 11 wherein said mold form comprises:
   a shallow cup-shaped body having a peripheral rim on one side for engaging said flange of said disk-shaped body;
   a plurality of cylindrical blind apertures formed downwardly in said mold body and spaced to align with said apertures of said disk-shaped body; and
   means cooperating with said mounting apertures in said disk-shaped body for securing said mold form to said disk-shaped body.

13. The system as defined in claim 12 wherein said mold form is made of a resilient polymeric material.

14. The system as defined in claim 13 wherein said mold form includes an embedded reinforcing metal disk and said cooperating means comprises threaded mounting bosses extending from said embedded disk.

15. The system as defined in claim 11 and wherein said indexing ring has adjustable stops mounted therein, said indexing ring including means for removably mounting said ring to said disk-shaped body.

16. The system as defined in claim 15 and further including a reference plate and means for removably securing said disk-shaped body and ring to said reference plate for adjusting said stops against said reference plate to position an end of each stop in a spaced relationship with respect to said one side of said disk-shaped body.

* * * * *